(12) United States Patent
Raghavan et al.

(10) Patent No.: US 11,622,348 B2
(45) Date of Patent: Apr. 4, 2023

(54) PREEMPTION OF SYMBOLS IN A SLOT FORMAT INDEX

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/193,972

(22) Filed: Mar. 5, 2021

(65) Prior Publication Data

US 2021/0307007 A1 Sep. 30, 2021

Related U.S. Application Data

(60) Provisional application No. 63/000,888, filed on Mar. 27, 2020.

(51) Int. Cl.
*H04W 72/14* (2009.01)
*H04W 72/0446* (2023.01)
*H04W 72/08* (2009.01)

(52) U.S. Cl.
CPC ..... *H04W 72/0446* (2013.01); *H04W 72/082* (2013.01); *H04W 72/14* (2013.01)

(58) Field of Classification Search
CPC .......... H04W 72/0446; H04W 72/082; H04W 72/14; H04L 5/0094; H04L 5/0044; H04L 5/0007
See application file for complete search history.

(56) References Cited

U.S. PATENT DOCUMENTS

| | | | |
|---|---|---|---|
| 2019/0296881 A1* | 9/2019 | Ang | H04W 52/32 |
| 2020/0092880 A1* | 3/2020 | Choi | H04L 5/0094 |
| 2022/0007403 A1* | 1/2022 | Li | H04W 72/1289 |
| 2022/0132533 A1* | 4/2022 | Taherzadeh Boroujeni | H04L 5/0044 |

FOREIGN PATENT DOCUMENTS

| | | | | |
|---|---|---|---|---|
| EP | 2037608 A1 * | 3/2009 | ........... | H04L 1/0019 |
| WO | WO-2020168072 A1 * | 8/2020 | ......... | H04L 27/0006 |

OTHER PUBLICATIONS

International Search Report and Written Opinion—PCT/US2021/021351—ISA/EPO—dated Jun. 29, 2021.

(Continued)

*Primary Examiner* — Lan-Huong Truong
(74) *Attorney, Agent, or Firm* — Harrity & Harrity, LLP (57) ABSTRACT

Various aspects of the present disclosure generally relate to wireless communication. In some aspects, a user equipment may determine, for communications via a component carrier, to avoid one or more slot format indices (SFIs) associated with a set of configurations for a set of symbols; and transmit a request to avoid the one or more SFIs. Numerous other aspects are provided.

30 Claims, 6 Drawing Sheets

600 ⟶

(56) References Cited

OTHER PUBLICATIONS

TCL Communication: "Dynamic TDD—SFI Handling and Interference Management", 3GPP Draft, 3GPP TSG RAN WG1 Meeting #91, Tdoc: R1-1719706, Flexible TDD-SFI Handling and Interference_Manangement_TCL_Final, 3rd Generation Partnership Project (3GPP), Mobile Competence Centre, 650, Route Des Lucioles, F-06921 Sophi, vol. RAN WG1. No. Reno, Nevada, USA, Nov. 27-Dec. 1, 2017, Dec. 1, 2017, 5 Pages, XP051368862, Retrieved from the Internet: URL: http://www.3gpp.org/ftp/tsg%5Fran/WG1%5FRL1/TSGR1%5F91/Docs/. [retrieved on Nov. 17, 2017] section 2.2 figures 1,2, the Whole Document.

\* cited by examiner

PREEMPTION OF SYMBOLS IN A SLOT FORMAT INDEX

CROSS-REFERENCE TO RELATED APPLICATION

This Patent Application claims priority to Provisional Patent Application No. 63/000,888, filed on Mar. 27, 2020, entitled "PREEMPTION OF SYMBOLS IN A SLOT FORMAT INDEX," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for preemption of symbols in a slot format index.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include determining, for communications via a component carrier, to avoid one or more slot format indexes (SFIs) associated with a set of configurations for a set of symbols; and transmitting a request to avoid the one or more SFIs.

In some aspects, a UE for wireless communication may include a memory and one or more processors operatively coupled to the memory. The memory and the one or more processors may be configured to determine, for communications via a component carrier, to avoid one or more SFIs associated with a set of configurations for a set of symbols; and transmit a request to avoid the one or more SFIs.

In some aspects, a non-transitory computer-readable medium may store one or more instructions for wireless communication. The one or more instructions, when executed by one or more processors of a UE, may cause the one or more processors to determine, for communications via a component carrier, to avoid one or more SFIs associated with a set of configurations for a set of symbols; and transmit a request to avoid the one or more SFIs.

In some aspects, an apparatus for wireless communication may include means for determining, for communications via a component carrier, to avoid one or more SFIs associated with a set of configurations for a set of symbols; and means for transmitting a request to avoid the one or more SFIs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
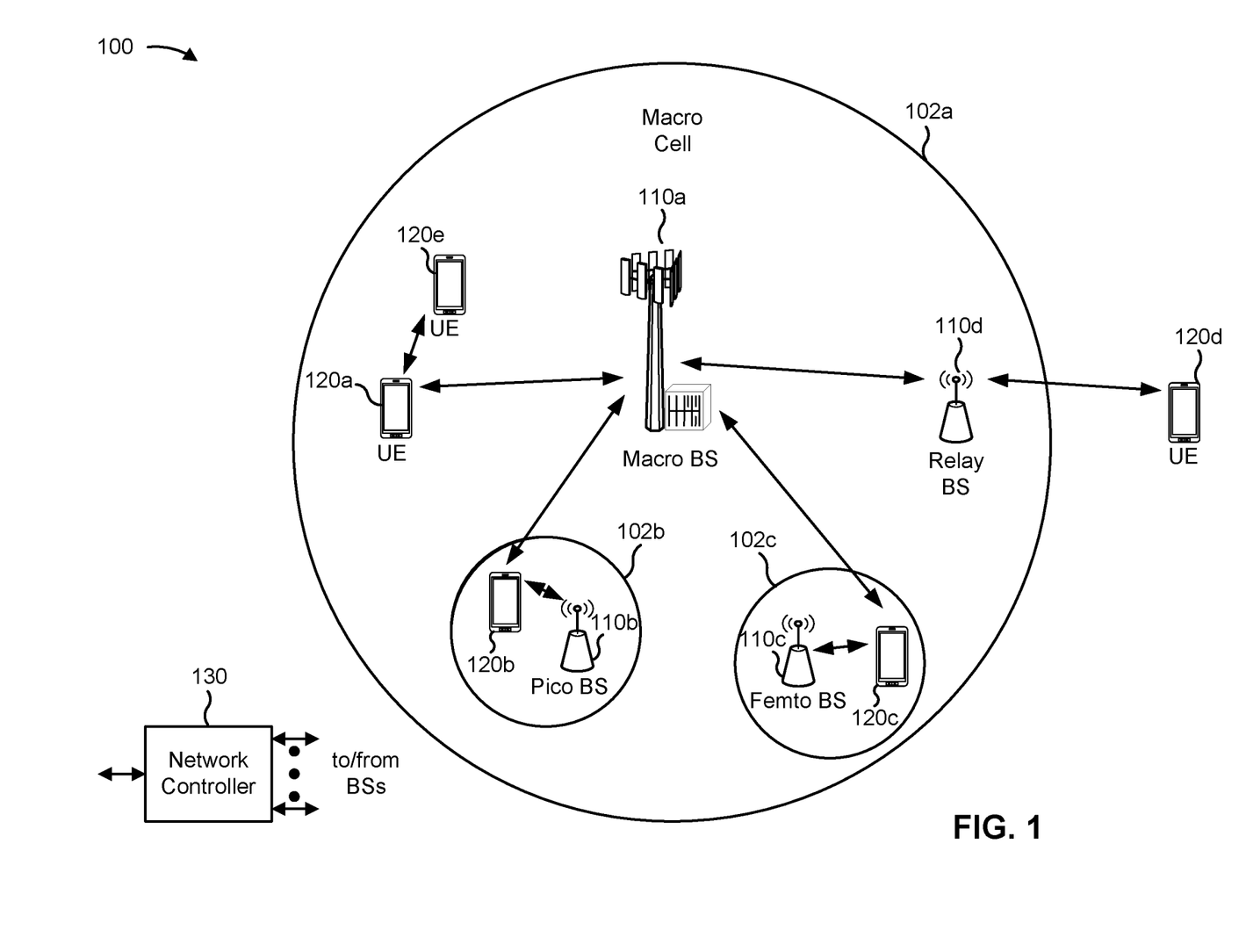
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
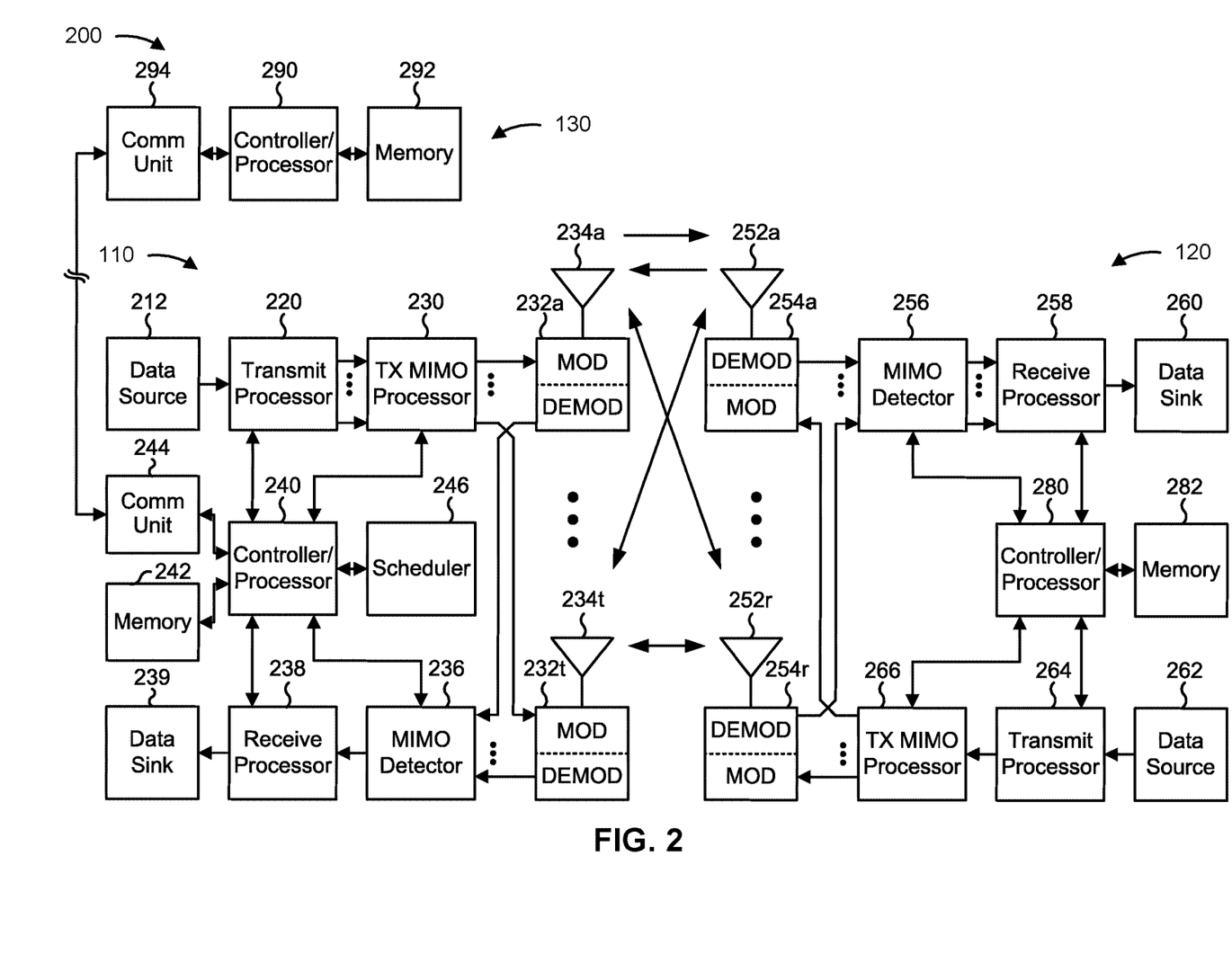
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5 and 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5 and 6).

Controller/processor 240 of base station 110, controller/processor 280 of UE 120, and/or any other component(s) of FIG. 2 may perform one or more techniques associated with preemption of symbols in a slot format index (SFI), as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE includes means for determining, for communications via a component carrier, to avoid one or more SFIs associated with a set of configurations for a set of symbols; and/or means for transmitting a request to avoid the one or more SFIs. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that use of the one or more SFIs has a likeliness, that satisfies a threshold likeliness, to be associated with a cross-link interference that satisfies a threshold amount of cross-link interference.

In some aspects, the UE includes means for determining that use of the one or more SFIs has a likeliness, that satisfies a threshold likeliness, to cause an uplink-downlink symbol mismatch for the set of beam pairs associated with the component carrier and an additional set of beam pairs associated with an additional component carrier.

In some aspects, the UE includes means for receiving, for communications via the component carrier, a resource grant having an SFI, wherein determining to avoid the one or more SFIs is based at least in part on receiving the resource grant having the SFI.

In some aspects, the UE includes means for transmitting the request to avoid the one or more SFIs before one or more base stations indicate availability of carrier aggregation of the component carrier and an additional component carrier.

In some aspects, the UE includes means for transmitting the request to avoid the one or more SFIs after carrier aggregation of the component carrier and an additional component carrier is established.

In some aspects, the UE includes means for transmitting a request for coordination between the first base station and the second base station to avoid uplink-downlink symbol mismatches.

In some aspects, the UE includes means for requesting a first set of reference signals for a first set of beam pairs associated with the component carrier; means for requesting a second set of reference signals for a second set of beam pairs associated with an additional component carrier; and/or means for determining, based at least in part on the first set of reference signals and the second set of reference signals, cross-link interference between one or more beams of the first set of beam pairs and one or more beams of the second set of beam pairs.

In some aspects, the UE includes means for determining the cross-link interference between the one or more beams of the first set of beam pairs and the one or more beams of the second set of beam pairs at particular frequencies based at least in part on the first set of reference signals and the second set of reference signals.

In some aspects, the UE includes means for reporting the cross-link interference between the one or more beams of the first set of beam pairs and the one or more beams of the second set of beam pairs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
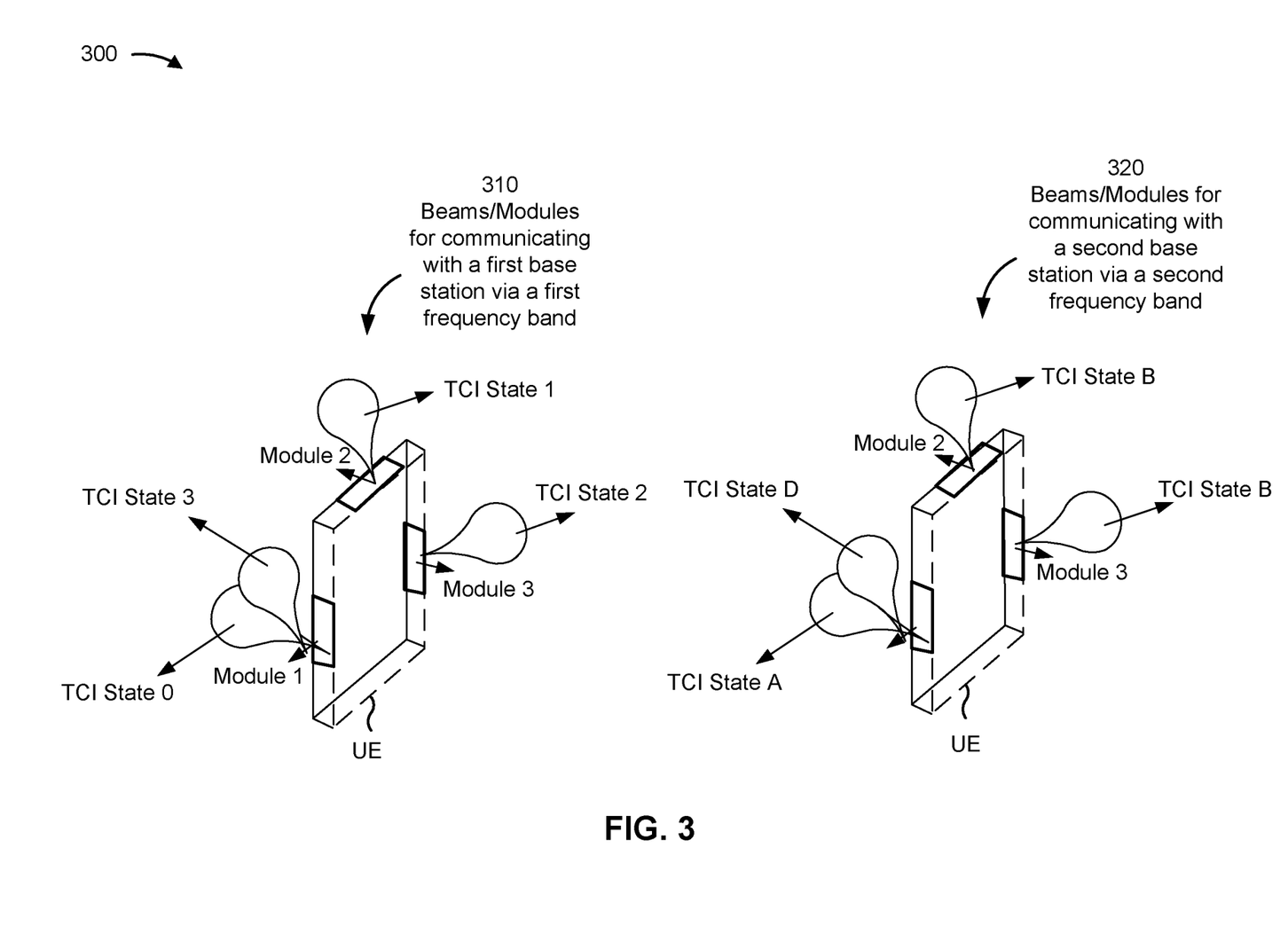
FIG. 3 is a diagram illustrating an example of beam training with a set of base stations using a set of frequency bands, in accordance with the present disclosure.

FIG. 3 is a diagram illustrating an example 300 of beam training with a set of base stations using a set of frequency bands, in accordance with the present disclosure.

As shown by reference number 310, a UE may perform beam training to identify beams and/or modules (e.g., antenna modules) for communicating with a first base station via a first frequency band. For example, the UE may identify first transmission configuration indicator (TCI) states 0, 1, 2, and 3 for communicating with the first base station using the first frequency band. As shown, TCI states 0 and 3 may use module 1 of the UE, TCI state 1 may use module 2 of the UE, and TCI state 2 may use module 3 of the UE.

As shown by reference number 320, the UE may perform beam training to identify beams and/or modules for communicating with a second base station via a second frequency band. For example, the UE may identify second TCI states A, B, C, and D for communicating with the second base station using the second frequency band. As shown, TCI states A and D may use module 1 of the UE, TCI state B may use module 2 of the UE, and TCI state C may use module 3 of the UE.

The first TCI states for communicating with the first base station and the second TCI states for communicating with the second base station may be correlated. For example, the first TCI states and the second TCI states may be correlated based at least in part on the first base station and the second base station being co-located and/or the first frequency band and the second frequency band being comparable with each other (e.g., both frequency bands are in a millimeter wave spectrum, frequencies in the first band are within a threshold percentage (e.g., 20%, 50%, and/or the like), and/or the like).

Based at least in part on being correlated, TCI state 0 and TCI state A may be similar (e.g., using a same module, using a similar communication path, pointing towards similar steering angles, and/or the like), TCI state 1 and TCI state B may be similar, TCI state 2 and TCI state C may be similar, TCI state 3 and TCI state D may be similar, and/or the like. Additionally, or alternatively, a strongest TCI state of the first TCI states may be correlated with a strongest TCI state of the second TCI states.

The UE may be configured to simultaneously receive downlink transmissions via the first band and via the second band via the TCI state 0 and the TCI state A and/or to transmit uplink transmissions via the first band and via the second band via the TCI state 0 and the TCI state A. However, in some instances, an uplink-downlink mismatch may cause cross-link interference (e.g., self-interference from the uplink transmissions for the downlink transmissions).

Some networks may use dynamic time division duplexing (TDD) and may configure some UEs to receive downlink transmissions during a same symbol during which other UEs transmit uplink transmissions (e.g., uplink-downlink mismatches between UEs). For some UEs (e.g., based at least in part on UE locations, UE communication paths, and/or the like), the uplink-downlink mismatches may cause increased cross-link interference.

As indicated above, FIG. 3 is provided as an example. Other examples may differ from what is described with respect to FIG. 3.

Figure 4:
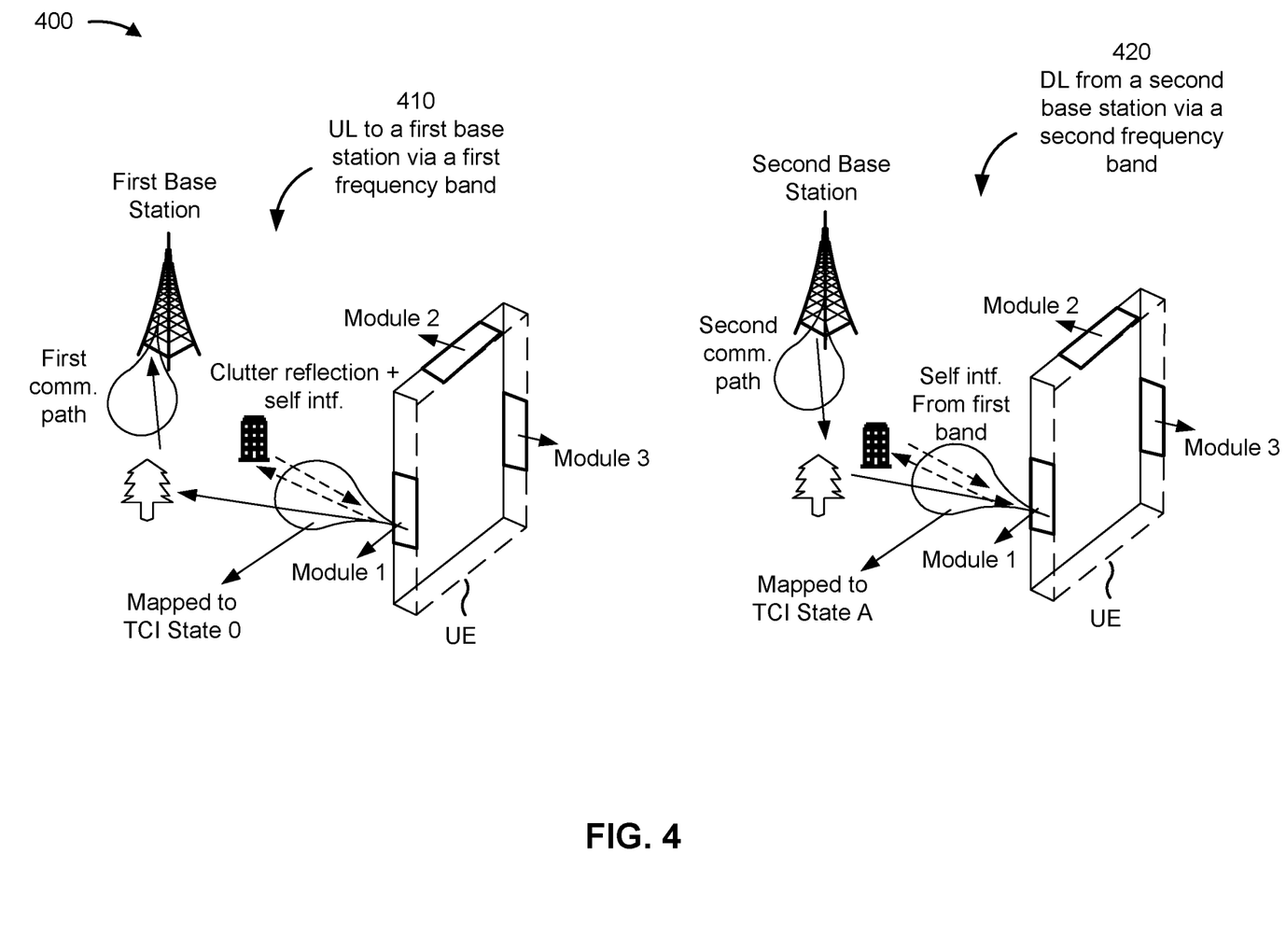
FIG. 4 is a diagram illustrating an example of communications with a set of base stations using a set of frequency bands, in accordance with the present disclosure.

FIG. 4 is a diagram illustrating an example 400 of communications with a set of base stations using a set of frequency bands, in accordance with the present disclosure.

As shown in FIG. 4, and by reference number 410, a UE may transmit an uplink transmission to a first base station using the first frequency band. For example, the UE may use TCI state 0 to transmit via the first frequency band based at least in part on the TCI state 0 being determined as a strongest TCI state for communicating via the first frequency band. A transmission using the TCI state 0 may travel to the first base station via a first communication path. Clutter in a local channel environment may lead to the transmission using the TCI state 0 to reflect back toward the UE. Reflected energy from the clutter may cause self-interference. However, because the UE is transmitting when the reflected energy arrives at the UE, the self-interference may not substantially adversely affect communication via the first frequency band.

As shown by reference number 420, the UE may attempt to receive a downlink transmission from a second base station using the second frequency band. For example, the UE may use TCI state A to attempt to receive a transmission via the second frequency band based at least in part on the TCI state A being determined as a strongest TCI state for communicating via the second frequency band. A transmission that the UE attempts to receive using the TCI state A may travel to the UE from the second base station via a second communication path. The second communication path may be similar to the first communication path (e.g., based at least in part on the first base station being co-located with the second base station).

The UE may attempt to receive the downlink transmission from a similar direction as the reflected energy due to the clutter propagates toward the UE and/or module 1. Based at least in part on the reflected energy leading to increased interference (e.g., self-interference, cross-link interference, and/or the like), the UE may be unable to receive (e.g., demodulate, decode, and/or the like) the downlink transmission via the second frequency band. In this way, the UE may fail to receive a downlink transmission based at least in part on interference from an uplink-downlink mismatch (e.g., for one or more symbols in an SFI) for the UE communicating via another frequency band or from other interference. The UE and/or the base station may use computing, communication, and/or network resources to recover from the failed downlink transmission, to determine that the failure is based at least in part on an uplink-downlink mismatch, and/or the like.

As indicated above, FIG. 4 is provided as an example. Other examples may differ from what is described with respect to FIG. 4.

In some aspects described herein, a UE may determine, for communications via a component carrier (e.g., for communications with a first base station via a first frequency band) to avoid one or more SFIs associated with a set of configurations for a set of symbols. In some aspects, the UE may determine to avoid the one or more SFIs based at least in part on a likeliness (e.g., a likeliness that satisfies a threshold likeliness) to be associated with a cross-link interference (e.g., a cross-link interference that satisfies a threshold amount of cross-link interference). For example, the UE may determine that the likeliness to be associated with the cross-link interference is based at least in part on the one or more SFIs having an uplink-downlink symbol mismatch with one or more SFIs of an additional component carrier used by the UE for communication with a second base station (e.g., when using carrier aggregation).

The UE may transmit a request to avoid the one or more SFIs. For example, the UE may transmit the request to the first base station and/or the second base station to indicate the one or more SFIs to avoid, an indication of set of preferred SFIs, and/or the like. Based at least in part on the UE transmitting the request to avoid the one or more SFIs, the base station may avoid using the one or more SFIs, decrease a likelihood of failed downlink transmissions, and/or the like. In this way, the UE and/or the base station may conserve computing, communication, and/or network resources that may otherwise be used to recover from failed downlink transmissions, to determine that the failure is based at least in part on an uplink-downlink mismatch, to replace an existing SFI for the UE, and/or the like.

Figure 5:
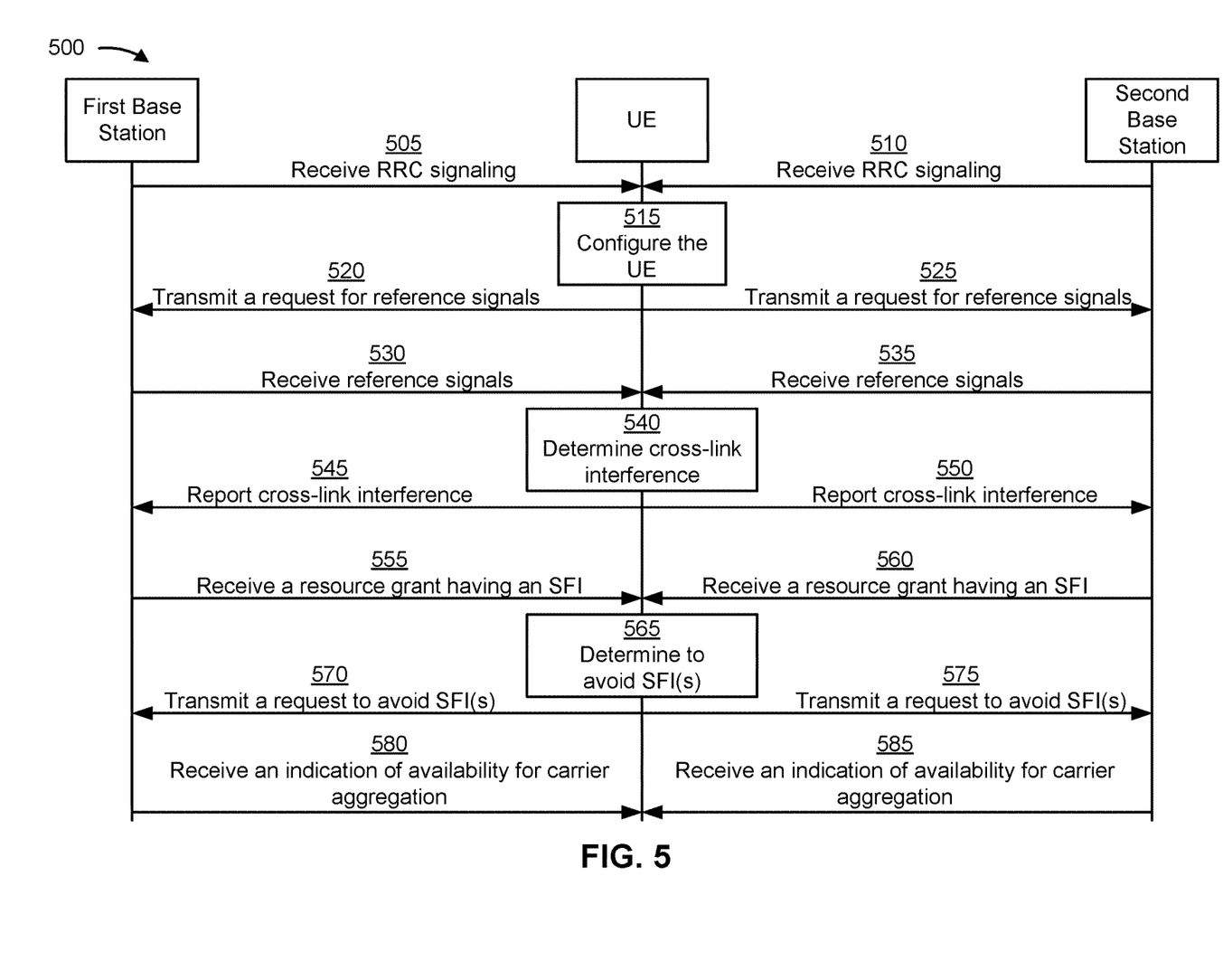
FIG. 5 is a diagram illustrating an example of preemption of symbols in a slot format index, in accordance with the present disclosure.

FIG. 5 is a diagram illustrating an example 500 of preemption of symbols in an SFI, in accordance with the present disclosure. As shown, a UE (e.g., UE 120) communicates with a first base station (e.g., base station 110) and a second base station using one or more of downlink transmissions and uplink transmissions. In some aspects, the UE, the first base station, and/or the second base station may be part of one or more wireless networks (e.g., the wireless network 100). In some aspects, the first base station and the second base station may be co-located. In some aspects, the UE may be configured with multiple antenna modules through which the UE may communicate with the base station.

As shown in FIG. 5, and by reference numbers 505 and 510, the UE may receive radio resource control (RRC) signaling (e.g., from the first base station and/or the second base station) with information to configure the UE. In some aspects, the RRC signaling and/or other signaling may indicate that the UE is to be configured to determine cross-link interference based at least in part on reference signals from multiple base stations. In some aspects, the RRC signaling and/or other signaling may indicate that the UE is to be configured to determine one or more SFIs to avoid (e.g., based at least in part on determining that cross-link interference is associated with the one or more SFIs). In some aspects, the RRC signaling and/or other signaling may indicate that the UE is to transmit a request to avoid the one or more SFIs.

As shown by reference number 515, the UE may configure the UE. In some aspects, the UE may configure the UE based at least in part on the RRC signaling and/or other signaling. The UE may configure the UE to determine cross-link interference based at least in part on reference signals from multiple base stations, to determine one or more SFIs to avoid, to transmit a request to avoid the one or more SFIs, and/or the like.

As shown by reference number 520, the UE may transmit a first request for reference signals from the first base station. In some aspects, the UE may request a first set of reference signals (e.g., channel state information reference signals (CSI-RSs) for a first set of beam pairs associated with a first component carrier that is associated with the first base station. In some aspects, the first set of reference signals may be located within a frequency band of the first component carrier. In other words, the first set of reference signals may be associated with one or more bandwidth parts of the first component carrier and may be frequency-specific (e.g., using a specific combination of resources across the first resource band). In some aspects, the UE may request a resource grant for the UE to transmit reference signals (e.g., sounding reference signals (SRSs)) toward the first base station using one or more beams and/or one or more antenna modules.

As shown by reference number 525, the UE may transmit a second request for reference signals from the second base station. In some aspects, the UE may request a second set of reference signals (e.g., CSI-RSs) for a second set of beam pairs associated with a second component carrier that is associated with the second base station. In some aspects, the second set of reference signals may be located within a frequency band of the second component carrier. In other words, the second set of reference signals may be associated with one or more bandwidth parts of the second component carrier and may be frequency-specific (e.g., using a specific combination of resources across the second resource band). In some aspects, the UE may request a resource grant for the UE to transmit reference signals (e.g., sounding reference signals (SRSs)) toward the second base station using one or more beams and/or one or more antenna modules.

As shown by reference number 530, the UE may receive reference signals from the first base station. In some aspects, the UE may receive the reference signals within a frequency band of the first component carrier. In some aspects, the UE may transmit reference signals toward the first base station using one or more beams.

As shown by reference number 535, the UE may receive reference signals from the second base station. In some aspects, the UE may receive the reference signals within a frequency band of the first component carrier. In some aspects, the UE may transmit reference signals toward the second base station using one or more beams.

As shown by reference number 540, the UE may determine cross-link interference. In some aspects, the UE may determine cross-link interference between one or more beams of the first set of beam pairs and one or more beams of the second set of beam pairs. In some aspects, the cross-link interference may be based at least in part on an uplink-downlink symbol mismatch between the one or more beams of the first set of beam pairs and one or more beams of the second set of beam pairs. In some aspects, the UE may determine the cross-link interference between the one or more beams of the first set of beam pairs and the one or more beams of the second set of beam pairs at particular frequencies based at least in part on the first set of reference signals and the second set of reference signals.

As shown by reference numbers 545 and 550, the UE may report the cross-link interference to the first base station and/or the second base station. For example, the UE may report the cross-link interference using a physical uplink control channel (PUCCH) communication, a medium access control control element (MAC-CE), and/or the like. In some aspects, the UE may report the cross-link interference with an indication of the one or more beams of the first set of beam pairs and the one or more beams of the second set of beam pairs for which the UE determined the cross-link interference. In this way, the UE may indicate to the first base station and/or the second base station that certain beams of the first set of beam pairs may cause cross-link interference for certain beams of the second set of beam pairs, and/or certain beams of the second set of beam pairs can cause cross-link interference for certain beams of the first set of beam pairs, when SFIs for the first carrier and the second carrier have an uplink-downlink symbol mismatch.

As shown by reference number 555 and 560, the UE may receive (e.g., from the first base station and/or the second base station) one or more resource grants having associated SFIs. For example, the one or more resource grants may include a semi-persistent scheduling resource grant, a dynamic resource grant, and/or the like.

As shown by reference number 565, the UE may determine to avoid one or more SFIs that are associated with a set of configurations for a set of symbols. In some aspects, the UE may determine to avoid a first set of the one or more SFIs when communicating via the first component carrier using a first beam, a second set of the one or more SFIs when communicating using a second beam, and/or the like. In some aspects, the UE may determine to avoid a third set of the one or more SFIs when communicating via the second component carrier using a third beam, a fourth set of the one or more SFIs when communicating using a fourth beam, and/or the like.

In some aspects, the cross-link interference may be based at least in part on an uplink-downlink symbol mismatch for the first set of beam pairs associated with the first component carrier and the second set of beam pairs associated with the second component carrier to be used for communication using carrier aggregation.

In some aspects, the UE may determine to avoid the one or more SFIs based at least in part on determining that use of the one or more SFIs has a likeliness, that satisfies a threshold likeliness, to be associated with a cross-link interference that satisfies a threshold amount of cross-link interference. For example, the UE may determine the likeliness to be associated with the cross link interference based at least in part on prior information (e.g., measurements of received and/or transmitted reference signals).

In some aspects, the UE may determine to avoid the one or more SFIs based at least in part on determining that use of the one or more SFIs has a likeliness, that satisfies a threshold likeliness (e.g., satisfies a likeliness threshold), to cause an uplink-downlink symbol mismatch for the first set of beam pairs associated with the first component carrier and a second set of beam pairs associated with the second component carrier.

As shown by reference numbers 570 and 575, the UE may transmit one or more requests (e.g., to the first base station and/or the second base station) to avoid the one or more SFIs. In some aspects, the UE may transmit the one or more requests via PUCCH communications, MAC CEs, and/or the like. In some aspects, the UE may transmit the one or more request to avoid the one or more SFIs based at least in part on determining that an SFI of a resource grant is one of the one or more SFIs to avoid. In some aspects the UE may transmit the one or more requests to avoid the one or more SFIs after carrier aggregation of the first component carrier and the second component carrier is established. In some aspects, the UE may transmit the one or more requests to avoid the one or more SFIs before receiving a resource grant from the first base station and/or the second base station and/or before carrier aggregation is established.

In some aspects, the one or more requests to avoid the one or more SFIs may indicate a set of beam pairs to use for the one or more SFIs that are requested to be avoided. In some aspects, the one or more requests to avoid the one or more SFIs may indicate a set of beam pairs to not use for the one or more SFIs that are requested to be avoided.

In some aspects, the one or more requests to avoid the one or more SFIs may include an indication of a set of preferred SFIs for the first component carrier and/or the second component carrier, a request to configure an SFI of the set of preferred SFIs for the first component carrier and/or the second component carrier, an indication of the one or more SFIs to avoid for the first component carrier and/or the second component carrier, or a request to avoid configuration of the one or more SFIs for the first component carrier and/or the second component carrier.

In some aspects, the one or more requests to avoid the one or more SFIs may include a request for coordination between the first base station and the second base station to avoid uplink-downlink symbol mismatches. The request for coordination may indicate certain beams associated with the first component carrier and certain beams of the second component carrier for which the first base station and the second base station is to coordinate to avoid uplink-downlink symbol mismatches.

As shown by reference numbers 580 and 585, the UE may receive one or more indications (e.g., from the first base station and/or the second base station) of availability for carrier aggregation. In some aspects, the UE may receive the one or more indications after transmitting the one or more requests to avoid the one or more SFIs.

In some aspects, the UE may establish carrier aggregation of the first component carrier and the second component carrier. The carrier aggregation may include contiguous or non-contiguous carrier aggregation and/or may include intra-band or inter-band carrier aggregation.

In some aspects, the UE may receive one or more indications of SFIs for communicating with the first base station and/or the second base station. The one or more indications of the SFIs may be based at least in part on the request to avoid the one or more SFIs. For example, the UE may receive an indication of a first SFI for communication with the first base station and a second SFI for communication with the second base station, with the first SFI and the second SFI expected to not cause interference (e.g., interference above a threshold for reception by the UE) based at least in part on indications and/or information within the request to avoid SFIs.

Based at least in part on the UE transmitting the request to avoid the one or more SFIs, the first base station and/or the second base station may avoid using the one or more SFIs, decrease a likelihood of failed downlink transmissions, and/or the like. In this way, the UE, the first base station, and/or the second base station may conserve computing, communication, and/or network resources that may otherwise be used to recover from failed downlink transmissions, to determine that the failure is based at least in part on an uplink-downlink mismatch, to replace an existing SFI for the UE, and/or the like.

As indicated above, FIG. 5 is provided as an example. Other examples may differ from what is described with respect to FIG. 5.

Figure 6:
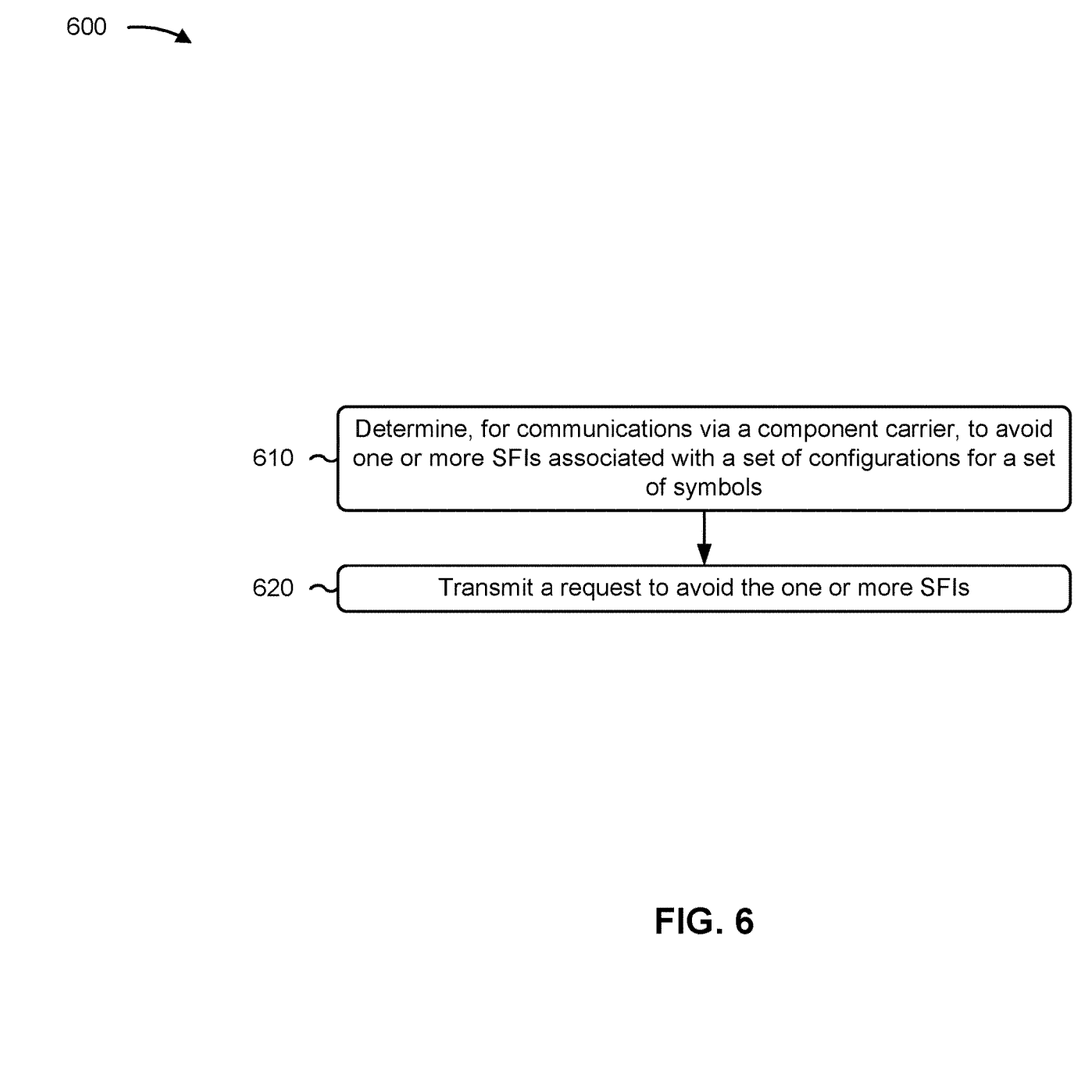
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with preemption of symbols in an SFI.

As shown in FIG. 6, in some aspects, process 600 may include determining, for communications via a component carrier, to avoid one or more SFIs associated with a set of configurations for a set of symbols (block 610). For example, the UE (e.g., using receive processor 258, transmit processor 264, controller/processor 280, memory 282, and/or the like) may determine, for communications via a component carrier, to avoid one or more SFIs associated with a set of configurations for a set of symbols, as described above.

As further shown in FIG. 6, in some aspects, process 600 may include transmitting a request to avoid the one or more SFIs (block 620). For example, the UE (e.g., using transmit processor 264, controller/processor 280, memory 282, and/or the like) may transmit a request to avoid the one or more SFIs, as described above.

Process 600 may include additional aspects, such as any single aspect or any combination of aspects described below and/or in connection with one or more other processes described elsewhere herein.

In a first aspect, determining to avoid the one or more SFIs includes determining that use of the one or more SFIs has a likeliness, that satisfies a threshold likeliness, to be associated with a cross-link interference that satisfies a threshold amount of cross-link interference.

In a second aspect, alone or in combination with the first aspect, the cross-link interference is based at least in part on an uplink-downlink symbol mismatch for a set of beam pairs associated with the component carrier and an additional set of beam pairs associated with an additional component carrier to be used for communication using carrier aggregation.

In a third aspect, alone or in combination with one or more of the first and second aspects, the request to avoid the one or more SFIs indicates a set of beam pairs to use or not to use for the one or more SFIs that are requested to be avoided.

In a fourth aspect, alone or in combination with one or more of the first through third aspects, determining to avoid the one or more SFIs includes determining that use of the one or more SFIs has a likeliness, that satisfies a threshold likeliness, to cause an uplink-downlink symbol mismatch for the set of beam pairs associated with the component carrier and an additional set of beam pairs associated with an additional component carrier.

In a fifth aspect, alone or in combination with one or more of the first through fourth aspects, the request to avoid the one or more SFIs comprises one or more of an indication of a set of preferred SFIs for the component carrier, a request to configure an SFI of the set of preferred SFIs for the component carrier, an indication of the one or more SFIs to avoid for the component carrier, or a request to avoid configuration of the one or more SFIs for the component carrier.

In a sixth aspect, alone or in combination with one or more of the first through fifth aspects, process 600 includes receiving, for communications via the component carrier, a resource grant having an SFI, wherein determining to avoid the one or more SFIs is based at least in part on receiving the resource grant having the SFI.

In a seventh aspect, alone or in combination with one or more of the first through sixth aspects, transmitting the request to avoid the one or more SFIs is based at least in part on determining that the SFI of the resource grant is one of the one or more SFIs to avoid.

In an eighth aspect, alone or in combination with one or more of the first through seventh aspects, transmitting the request to avoid the one or more SFIs includes transmitting the request to avoid the one or more SFIs before one or more base stations indicate availability of carrier aggregation of the component carrier and an additional component carrier.

In a ninth aspect, alone or in combination with one or more of the first through eighth aspects, transmitting the request to avoid the one or more SFIs includes transmitting the request to avoid the one or more SFIs after carrier aggregation of the component carrier and an additional component carrier is established.

In a tenth aspect, alone or in combination with one or more of the first through ninth aspects, a first base station is associated with the component carrier and a second base station is associated with an additional component carrier to be used for communication using carrier aggregation, and transmitting the request to avoid the one or more SFIs includes transmitting a request for coordination between the first base station and the second base station to avoid uplink-downlink symbol mismatches.

In an eleventh aspect, alone or in combination with one or more of the first through tenth aspects, the component carrier and an additional component carrier are to be used for communication using contiguous or non-contiguous intra-band or inter-band carrier aggregation, a first base station is associated with the component carrier and a second base station is associated with the additional component carrier, and determining to avoid the one or more SFIs is based at least in part on a likelihood of cross-link interference between communication via the component carrier and communication via the additional component carrier.

In a twelfth aspect, alone or in combination with one or more of the first through eleventh aspects, the first base station and the second base station are co-located.

In a thirteenth aspect, alone or in combination with one or more of the first through twelfth aspects, process 600 includes requesting a first set of reference signals for a first set of beam pairs associated with the component carrier, requesting a second set of reference signals for a second set of beam pairs associated with an additional component carrier; and determining, based at least in part on the first set of reference signals and the second set of reference signals, cross-link interference between one or more beams of the first set of beam pairs and one or more beams of the second set of beam pairs.

In a fourteenth aspect, alone or in combination with one or more of the first through thirteenth aspects, the first set of reference signals are located within a frequency band of the component carrier and the second set of reference signals are located within a frequency band of the additional component carrier, and determining the cross-link interference between the one or more beams of the first set of beam pairs and the one or more beams of the second set of beam pairs includes determining the cross-link interference between the one or more beams of the first set of beam pairs and the one or more beams of the second set of beam pairs at particular frequencies based at least in part on the first set of reference signals and the second set of reference signals.

In a fifteenth aspect, alone or in combination with one or more of the first through fourteenth aspects, process 600 includes reporting the cross-link interference between the one or more beams of the first set of beam pairs and the one or more beams of the second set of beam pairs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: determining, for communications via a component carrier, to avoid one or more slot format indices (SFIs) associated with a set of configurations for a set of symbols; and transmitting a request to avoid the one or more SFIs.

Aspect 2: The method of Aspect 1, wherein determining to avoid the one or more SFIs comprises: determining that use of the one or more SFIs has a likeliness, that satisfies a threshold likeliness, to be associated with a cross-link interference that satisfies a threshold amount of cross-link interference.

Aspect 3: The method of Aspect 2, wherein the cross-link interference is based at least in part on an uplink-downlink symbol mismatch for a set of beam pairs associated with the component carrier and an additional set of beam pairs associated with an additional component carrier to be used for communication using carrier aggregation.

Aspect 4: The method of any of Aspects 1-3, wherein the request to avoid the one or more SFIs indicates a set of beam pairs to use or not to use for the one or more SFIs that are requested to be avoided.

Aspect 5: The method of Aspect 4, wherein determining to avoid the one or more SFIs comprises: determining that use of the one or more SFIs has a likeliness, that satisfies a threshold likeliness, to cause an uplink-downlink symbol mismatch for the set of beam pairs associated with the component carrier and an additional set of beam pairs associated with an additional component carrier.

Aspect 6: The method of any of Aspects 1-5, wherein the request to avoid the one or more SFIs comprises one or more of: an indication of a set of preferred SFIs for the component carrier, a request to configure an SFI of the set of preferred SFIs for the component carrier, an indication of the one or more SFIs to avoid for the component carrier, or a request to avoid configuration of the one or more SFIs for the component carrier.

Aspect 7: The method of any of Aspects 1-6, further comprising: receiving, for communications via the component carrier, a resource grant having an SFI, wherein determining to avoid the one or more SFIs is based at least in part on receiving the resource grant having the SFI.

Aspect 8: The method of Aspect 7, wherein transmitting the request to avoid the one or more SFIs is based at least in part on determining that the SFI of the resource grant is one of the one or more SFIs to avoid.

Aspect 9: The method of any of Aspects 1-8, wherein transmitting the request to avoid the one or more SFIs comprises: transmitting the request to avoid the one or more SFIs before one or more base stations indicate availability of carrier aggregation of the component carrier and an additional component carrier.

Aspect 10: The method of any of Aspects 1-9, wherein transmitting the request to avoid the one or more SFIs comprises: transmitting the request to avoid the one or more SFIs after carrier aggregation of the component carrier and an additional component carrier is established.

Aspect 11: The method of any of Aspects 1-10, wherein a first base station is associated with the component carrier and a second base station is associated with an additional component carrier to be used for communication using carrier aggregation, and wherein transmitting the request to avoid the one or more SFIs comprises: transmitting a request for coordination between the first base station and the second base station to avoid uplink-downlink symbol mismatches.

Aspect 12: The method of any of Aspects 1-11, wherein the component carrier and an additional component carrier are to be used for communication using contiguous or non-contiguous intra-band or inter-band carrier aggregation, wherein a first base station is associated with the component carrier and a second base station is associated with the additional component carrier, and wherein determining to avoid the one or more SFIs is based at least in part on a likelihood of cross-link interference between communication via the component carrier and communication via the additional component carrier.

Aspect 13: The method of Aspect 12, wherein the first base station and the second base station are co-located.

Aspect 14: The method of any of Aspects 1-13, further comprising: requesting a first set of reference signals for a first set of beam pairs associated with the component carrier; requesting a second set of reference signals for a second set of beam pairs associated with an additional component carrier; and determining, based at least in part on the first set of reference signals and the second set of reference signals, cross-link interference between one or more beams of the first set of beam pairs and one or more beams of the second set of beam pairs.

Aspect 15: The method of Aspect 14, wherein the first set of reference signals are located within a frequency band of the component carrier and the second set of reference signals are located within a frequency band of the additional component carrier; and wherein determining the cross-link interference between the one or more beams of the first set of beam pairs and the one or more beams of the second set of beam pairs comprises: determining the cross-link interference between the one or more beams of the first set of beam pairs and the one or more beams of the second set of beam pairs at particular frequencies based at least in part on the first set of reference signals and the second set of reference signals.

Aspect 16: The method of Aspect 14, further comprising: reporting the cross-link interference between the one or more beams of the first set of beam pairs and the one or more beams of the second set of beam pairs.

Aspect 17: An apparatus for wireless communication at a device, comprising a processor; memory coupled with the processor; and instructions stored in the memory and executable by the processor to cause the apparatus to perform the method of one or more Aspects of Aspects 1-16.

Aspect 18: A device for wireless communication, comprising a memory and one or more processors coupled to the memory, the memory and the one or more processors configured to perform the method of one or more Aspects of Aspects 1-16.

Aspect 19: An apparatus for wireless communication, comprising at least one means for performing the method of one or more Aspects of Aspects 1-16.

Aspect 20: A non-transitory computer-readable medium storing code for wireless communication, the code comprising instructions executable by a processor to perform the method of one or more Aspects of Aspects 1-16.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining, based at least in part on a beam pair used for communications via a component carrier, to avoid one or more slot format indices (SFIs) associated with a set of configurations for a set of symbols; and
    transmitting a request to avoid the one or more SFIs.

2. The method of claim 1, wherein determining to avoid the one or more SFIs comprises:
    determining that use of the one or more SFIs has a likeliness, that satisfies a threshold likeliness, to be associated with a cross-link interference that satisfies a threshold amount of cross-link interference.

3. The method of claim 2, wherein the cross-link interference is based at least in part on an uplink-downlink symbol mismatch for a set of beam pairs associated with the component carrier and an additional set of beam pairs associated with an additional component carrier to be used for communication using carrier aggregation.

4. The method of claim 1, wherein the request to avoid the one or more SFIs indicates a set of beam pairs to use or not to use for the one or more SFIs that are requested to be avoided.

5. The method of claim 4, wherein determining to avoid the one or more SFIs comprises:
   determining that use of the one or more SFIs has a likeliness, that satisfies a threshold likeliness, to cause an uplink-downlink symbol mismatch for the set of beam pairs associated with the component carrier and an additional set of beam pairs associated with an additional component carrier.

6. The method of claim 1, wherein the request to avoid the one or more SFIs comprises one or more of:
   an indication of a set of preferred SFIs for the component carrier,
   a request to configure an SFI of the set of preferred SFIs for the component carrier,
   an indication of the one or more SFIs to avoid for the component carrier, or
   a request to avoid configuration of the one or more SFIs for the component carrier.

7. The method of claim 1, further comprising:
   receiving, for communications via the component carrier, a resource grant having an SFI,
      wherein determining to avoid the one or more SFIs is based at least in part on receiving the resource grant having the SFI.

8. The method of claim 7, wherein transmitting the request to avoid the one or more SFIs is based at least in part on determining that the SFI of the resource grant is one of the one or more SFIs to avoid.

9. The method of claim 1, wherein transmitting the request to avoid the one or more SFIs comprises:
   transmitting the request to avoid the one or more SFIs before one or more base stations indicate availability of carrier aggregation of the component carrier and an additional component carrier.

10. The method of claim 1, wherein a first base station is associated with the component carrier and a second base station is associated with an additional component carrier to be used for communication using carrier aggregation, and
   wherein transmitting the request to avoid the one or more SFIs comprises:
      transmitting a request for coordination between the first base station and the second base station to avoid uplink-downlink symbol mismatches.

11. The method of claim 1, further comprising:
   requesting a first set of reference signals for a first set of beam pairs associated with the component carrier;
   requesting a second set of reference signals for a second set of beam pairs associated with an additional component carrier; and
   determining, based at least in part on the first set of reference signals and the second set of reference signals, cross-link interference between one or more beams of the first set of beam pairs and one or more beams of the second set of beam pairs.

12. The method of claim 11, wherein the first set of reference signals are located within a frequency band of the component carrier and the second set of reference signals are located within a frequency band of the additional component carrier; and
   wherein determining the cross-link interference between the one or more beams of the first set of beam pairs and the one or more beams of the second set of beam pairs comprises:
      determining the cross-link interference between the one or more beams of the first set of beam pairs and the one or more beams of the second set of beam pairs at particular frequencies based at least in part on the first set of reference signals and the second set of reference signals.

13. The method of claim 11, further comprising:
   reporting the cross-link interference between the one or more beams of the first set of beam pairs and the one or more beams of the second set of beam pairs.

14. A user equipment (UE) for wireless communication, comprising:
   a memory; and
   one or more processors, coupled to the memory, configured to cause the UE to:
      determine, based at least in part on a beam pair used for communications via a component carrier, to avoid one or more slot format indices (SFIs) associated with a set of configurations for a set of symbols; and
      transmit a request to avoid the one or more SFIs.

15. The UE of claim 14, wherein the one or more processors, to determine to avoid the one or more SFIs, are configured to cause the UE to:
   determine that use of the one or more SFIs has a likeliness, that satisfies a threshold likeliness, to be associated with a cross-link interference that satisfies a threshold amount of cross-link interference.

16. The UE of claim 15, wherein the cross-link interference is based at least in part on an uplink-downlink symbol mismatch for a set of beam pairs associated with the component carrier and an additional set of beam pairs associated with an additional component carrier to be used for communication using carrier aggregation.

17. The UE of claim 14, wherein the request to avoid the one or more SFIs indicates a set of beam pairs to use or not to use for the one or more SFIs that are requested to be avoided.

18. The UE of claim 17, wherein the one or more processors, to determine to avoid the one or more SFIs, are configured to cause the UE to:
   determine that use of the one or more SFIs has a likeliness, that satisfies a threshold likeliness, to cause an uplink-downlink symbol mismatch for the set of beam pairs associated with the component carrier and an additional set of beam pairs associated with an additional component carrier.

19. The UE of claim 14, wherein the request to avoid the one or more SFIs comprises one or more of:
   an indication of a set of preferred SFIs for the component carrier,
   a request to configure an SFI of the set of preferred SFIs for the component carrier,
   an indication of the one or more SFIs to avoid for the component carrier, or
   a request to avoid configuration of the one or more SFIs for the component carrier.

20. The UE of claim 14, wherein the one or more processors are further configured to cause the UE to:
   receive, for communications via the component carrier, a resource grant having an SFI,
      wherein determining to avoid the one or more SFIs is based at least in part on receiving the resource grant having the SFI.

21. The UE of claim 20, wherein transmitting the request to avoid the one or more SFIs is based at least in part on determining that the SFI of the resource grant is one of the one or more SFIs to avoid.

22. The UE of claim 14, wherein the one or more processors, to transmit the request to avoid the one or more SFIs, are configured to cause the UE to:
transmit the request to avoid the one or more SFIs before one or more base stations indicate availability of carrier aggregation of the component carrier and an additional component carrier.

23. The UE of claim 14, wherein a first base station is associated with the component carrier and a second base station is associated with an additional component carrier to be used for communication using carrier aggregation, and
wherein the one or more processors, to transmit the request to avoid the one or more SFIs, are configured to cause the UE to:
transmit a request for coordination between the first base station and the second base station to avoid uplink-downlink symbol mismatches.

24. The UE of claim 14, wherein the one or more processors are further configured to cause the UE to:
request a first set of reference signals for a first set of beam pairs associated with the component carrier;
request a second set of reference signals for a second set of beam pairs associated with an additional component carrier; and
determine, based at least in part on the first set of reference signals and the second set of reference signals, cross-link interference between one or more beams of the first set of beam pairs and one or more beams of the second set of beam pairs.

25. The UE of claim 24, wherein the first set of reference signals are located within a frequency band of the component carrier and the second set of reference signals are located within a frequency band of the additional component carrier; and
wherein determining the cross-link interference between the one or more beams of the first set of beam pairs and the one or more beams of the second set of beam pairs comprises:
determining the cross-link interference between the one or more beams of the first set of beam pairs and the one or more beams of the second set of beam pairs at particular frequencies based at least in part on the first set of reference signals and the second set of reference signals.

26. The UE of claim 24, wherein the one or more processors are further configured to cause the UE to:
report the cross-link interference between the one or more beams of the first set of beam pairs and the one or more beams of the second set of beam pairs.

27. A non-transitory computer-readable medium storing a set of instructions for wireless communication, the set of instructions comprising:
one or more instructions that, when executed by one or more processors of a user equipment (UE), cause the UE to:
determine, based at least in part on a beam pair used for communications via a component carrier, to avoid one or more slot format indices (SFIs) associated with a set of configurations for a set of symbols; and
transmit a request to avoid the one or more SFIs.

28. The non-transitory computer-readable medium of claim 27, wherein the request to avoid the one or more SFIs indicates a set of beam pairs to use or not to use for the one or more SFIs that are requested to be avoided.

29. An apparatus for wireless communication, comprising:
means for determining, based at least in part on a beam pair used for communications via a component carrier, to avoid one or more slot format indices (SFIs) associated with a set of configurations for a set of symbols; and
means for transmitting a request to avoid the one or more SFIs.

30. The apparatus of claim 29, wherein the request to avoid the one or more SFIs indicates a set of beam pairs to use or not to use for the one or more SFIs that are requested to be avoided.

* * * * *